US009038490B2

(12) United States Patent
Huebner et al.

(10) Patent No.: US 9,038,490 B2
(45) Date of Patent: May 26, 2015

(54) TRACTORS INCLUDING AUTOMATIC RESET OF A POWER TAKEOFF CIRCUIT

(71) Applicant: Briggs & Stratton Corporation, Wauwatosa, WI (US)

(72) Inventors: Joe Huebner, Random Lake, WI (US); Andrew J. Paskov, Brookfield, WI (US); Jeffrey James Von Haden, Hartford, WI (US)

(73) Assignee: BRIGGS & STRATTON CORPORATION, Wauwatosa, WI (US)

( * ) Notice: Subject to any disclaimer, the term of this patent is extended or adjusted under 35 U.S.C. 154(b) by 0 days.

(21) Appl. No.: 14/025,024

(22) Filed: Sep. 12, 2013

(65) Prior Publication Data

US 2014/0069216 A1 Mar. 13, 2014

Related U.S. Application Data

(60) Provisional application No. 61/700,710, filed on Sep. 13, 2012.

(51) Int. Cl.
*B60K 25/06* (2006.01)
*B60K 28/10* (2006.01)
(Continued)

(52) U.S. Cl.
CPC .................. *B60K 25/06* (2013.01); *B60K 28/10* (2013.01); *B60W 10/06* (2013.01); *B60W 10/30* (2013.01);
(Continued)

(58) Field of Classification Search
CPC F02N 2200/0812; B60K 17/28; B60K 25/00; B60K 25/02; B60K 25/04; B60K 25/06; B60K 25/08; B60K 25/10; B60Y 2200/22; B60Y 2200/221; B60Y 2200/222; B60Y 2200/223; A01B 71/06; A01B 71/063; A01D 69/002; Y10S 180/90; B60G 2300/08; B60G 2300/082; B60G 2300/084; B60H 1/0045
USPC ........... 180/53.1, 53.2, 53.3, 53.4, 53.5, 53.6, 180/53.61, 53.62, 53.7, 53.8; 74/11, 15.63, 74/15.6, 15.66, 15.69, 15.8, 15.84, 15.86, 74/15.88
See application file for complete search history.

(56) References Cited

U.S. PATENT DOCUMENTS 3,440,740 A 4/1969 Kamlukin
3,583,825 A 6/1971 Sadler et al.
(Continued)

FOREIGN PATENT DOCUMENTS

EP 0421542 3/1994

OTHER PUBLICATIONS

Briggs & Stratton Power Products Group, LLC, Simplicity Operator's Manual, Conquest Series, 2013, 40 pages.

*Primary Examiner* — Keith Frisby
(74) *Attorney, Agent, or Firm* — Foley & Lardner LLP

(57) ABSTRACT

A tractor includes a prime mover, a driven implement selectively engaged with the prime mover, and a switch for selectively engaging and disengaging the driven implement with the prime mover. The switch has three positions including a disengaged position, a momentary position, and an engaged position located between the disengaged position and the momentary position. The prime mover can be started with the switch in the disengaged position. The prime mover can be started with the switch in the engaged position when the switch was previously moved to the momentary position before being moved to the engaged position, such that after operation of the prime mover is stopped, the prime mover can be restarted without changing the position of the switch.

19 Claims, 8 Drawing Sheets

(51) Int. Cl.
  *B60W 10/06* (2006.01)
  *B60W 10/30* (2006.01)
  *F02N 11/10* (2006.01)
  *B60K 28/00* (2006.01)

(52) U.S. Cl.
  CPC ..... *B60K 2028/003* (2013.01); *B60Y 2200/223* (2013.01); *F02N 11/101* (2013.01); *F02N 2200/0812* (2013.01)

(56) References Cited

U.S. PATENT DOCUMENTS

| | | |
|---|---|---|
| 4,191,270 A | 3/1980 | Monteith |
| 4,621,699 A | 11/1986 | Slazas |
| 4,776,226 A | 10/1988 | Zenker |
| 4,938,302 A | 7/1990 | Schott et al. |
| 5,237,883 A * | 8/1993 | Churchill et al. ............ 74/11 |

* cited by examiner

TRACTORS INCLUDING AUTOMATIC RESET OF A POWER TAKEOFF CIRCUIT

CROSS-REFERENCE TO RELATED PATENT APPLICATIONS

This application claims the benefit of U.S. Provisional Application No. 61/700,710, filed Sep. 13, 2012, which is incorporated herein by reference in its entirety.

BACKGROUND

The present disclosure relates generally to the field of outdoor power equipment. More specifically the present disclosure relates to riding tractors.

A riding tractor includes a prime mover (e.g., an internal combustion engine, an electric motor, a hybrid drive, a hydraulic drive, etc.) that drives both at least one wheel and an implement (e.g., a cutting blade or blades, a cutting deck, a snow thrower or auger, a brush, a winch, a front end loader, a rear backhoe, a post hole auger, a tiller, a rear-mounted mower, etc.). A riding tractor also supports and carries an operator (e.g., in a sitting or standing position).

SUMMARY

One embodiment of the invention relates to a tractor includes a prime mover, a driven implement selectively engaged with the prime mover, and a switch for selectively engaging and disengaging the driven implement with the prime mover. The switch has three positions including a disengaged position, a momentary position, and an engaged position located between the disengaged position and the momentary position. The prime mover can be started with the switch in the disengaged position. The prime mover can be started with the switch in the engaged position when the switch was previously moved to the momentary position before being moved to the engaged position, such that after operation of the prime mover is stopped, the prime mover can be restarted without changing the position of the switch.

Another embodiment of the invention relates to a tractor including a prime mover, a driven implement selectively engaged with the prime mover, and a multi-position switch for selectively engaging and disengaging the driven implement with the prime mover. The prime mover can be started without the multi-position switch being in a disengaged position.

Another embodiment of the invention relates to a tractor including a prime mover, a driven implement selectively engaged with the prime mover by a clutch, a switch for selectively engaging and disengaging the driven implement with the prime mover, and a latching relay electrically coupled between the clutch and the switch. The switch has three positions including a disengaged position, a momentary position, and an engaged position located between the disengaged position and the momentary position. Upon loss of electrical power to the latching relay the driven implement is disengaged. Following disengagement of the driven implement, the driven implement is re-engaged by movement of the switch from the engaged position to the momentary position without having to return the switch to the disengaged position.

BRIEF DESCRIPTION OF THE DRAWINGS

The invention will become more fully understood from the following detailed description, taken in conjunction with the accompanying drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
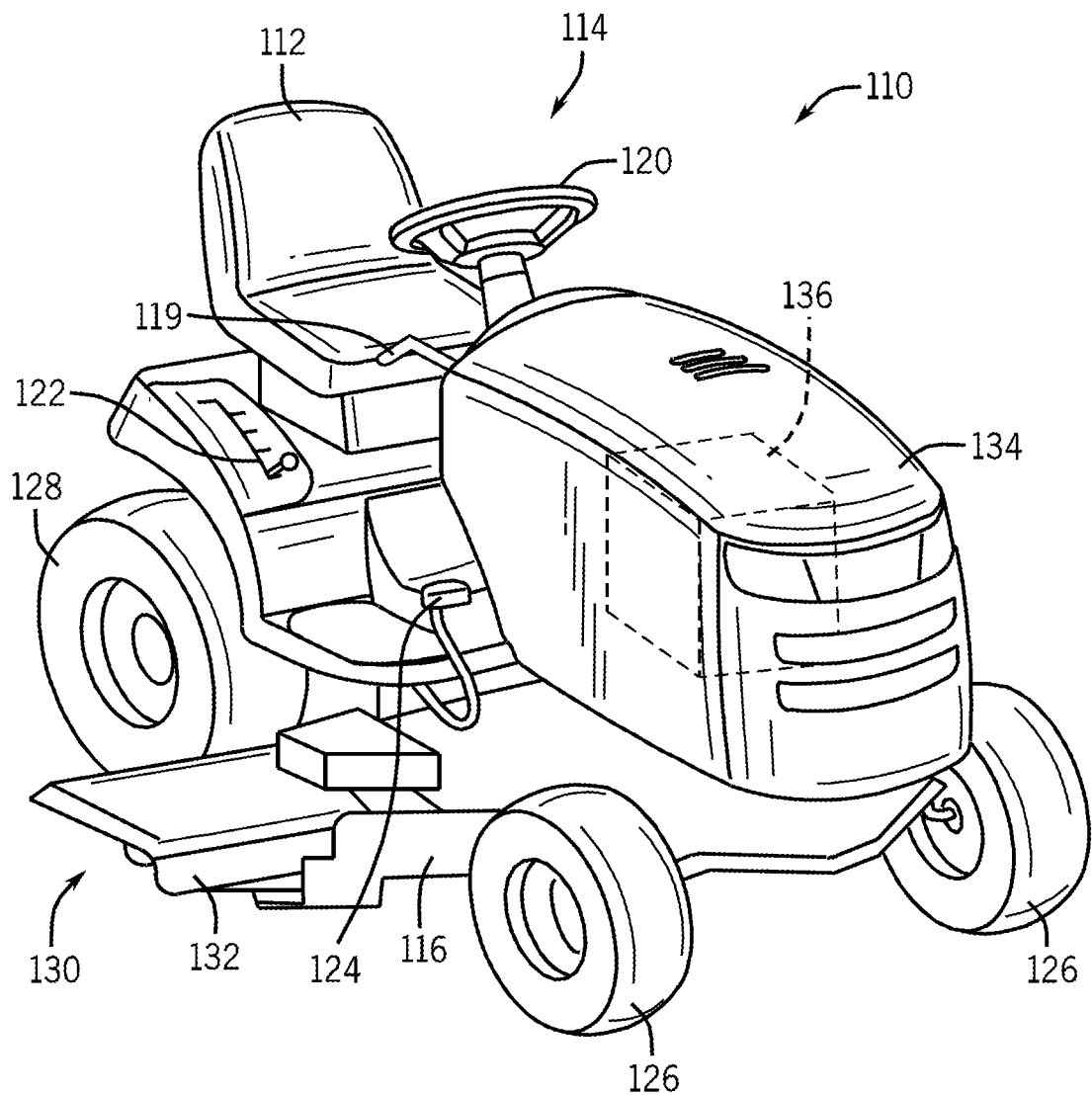
FIG. 1 is a front perspective view of a riding tractor according to an exemplary embodiment of the invention.
Figure 2:
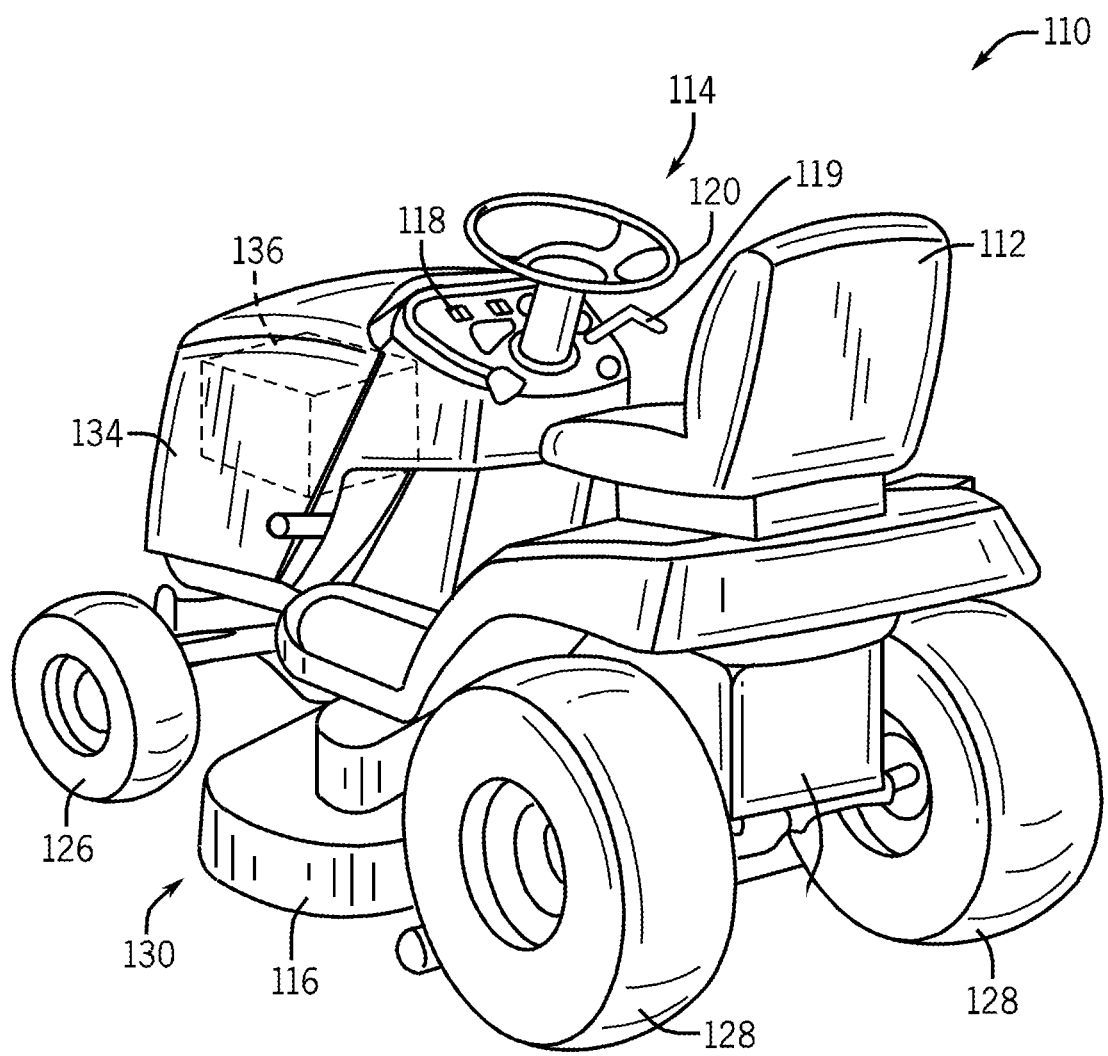
FIG. 2 is a rear perspective view of the riding tractor of FIG. 1.

Referring to FIGS. 1-2, a riding tractor 110 includes an operator seat 112, user controls 114 located on a mower frame near the operator seat 112, and a mowing deck 130 including one or more cutting blades. In some embodiments, the user controls 114 include an on/off switch 118 (e.g. a key-switch, an ignition switch, a push button, or other appropriate switch that selectively activates/deactivates the prime mover), a power take off ("PTO") engagement switch 119, a steering wheel 120, a reverse mow override (RMO) actuator 123 that is a component of an RMO circuit 121, a gear shift 122 (FIG. 1), a speed-control pedal 124 (FIG. 1), a brake pedal (not shown), and a parking brake actuator (not shown). As such, while seated in the operator seat 112, an operator may activate the riding tractor 110, control the direction and speed of the riding tractor 110, engage and disengage the implement (e.g. a cutting blade or blades, a cutting deck, a snow thrower or auger, a brush, a winch, a front end loader, a rear backhoe, a post hole auger, a tiller, a rear-mounted mower, etc.) attached to the PTO, and otherwise operate the riding tractor 110 by way of the user controls 114.

According to an exemplary embodiment, the riding tractor 110 further includes wheels 126, 128 where at least one of the wheels 126, 128 is powered by a prime mover 136 (e.g., an internal combustion engine, an electric motor, a hybrid drive, a hydraulic drive, etc.) of the riding tractor 110. In some embodiments, only the rear wheels 128 are coupled to the prime mover 136, and the rear wheels 128 move the tractor 110. In other embodiments rear and front wheels 126, 128 are both powered by the prime mover 136. In the embodiment shown in FIG. 1, the front wheels 126 are linked to the steering wheel 120, and are oriented by the steering wheel 120. In some embodiments, the front wheels 126 and the rear wheels 128 are linked with the steering wheel 120 to provide all wheel steering. In other contemplated embodiments, treads or other rotating or moving elements are used in place of wheels.

The riding tractor 110 includes a mowing deck 130 positioned between the front and rear wheels 126, 128. The mowing deck can also be positioned in front of the front wheels or behind the rear wheels. The deck 130 includes walls 116 at least partially surrounding the cutting blades and a chute 132 through which clippings exit the deck 130. Within the walls 116, one or more cutting blades (e.g., three) may be simultaneously run at high speeds to trim a swath of grass. In other embodiments, a riding tractor includes a reel or a multi-reel gang implement that is pushed or pulled by the riding tractor; and which is positioned forward, rearward, and/or to the side(s) of wheels of the riding tractor.

The cutting blades and the mower deck 130 are examples of implements driven by the prime mover 136. Other examples include a snow thrower or auger, a brush, a winch, a front end loader, a rear backhoe, a post hole auger, a tiller, and a rear-mounted mower. The implement is selectively coupled to a PTO of the prime mover 136 by a clutch. The implement is "engaged" by actuating the PTO engagement switch 119 to a PTO-engagement position, thereby engaging the clutch and coupling the implement to the PTO so that the PTO drives the implement. One way the implement is "disengaged" is by actuating the PTO engagement switch 119 to a PTO-disengaged or off position, thereby disengaging the clutch and decoupling the implement from the PTO. The operation of the PTO engagement switch 119 and the coupling and decoupling of the implement to the PTO will be discussed in more detail below.

According to an exemplary embodiment, the riding tractor 110 further includes a hood 134 (e.g., enclosure, housing) surrounding the prime mover 136.

In a conventional riding tractor, the operator must perform several tasks to start the prime mover. Typically, the operator must be seated in the operator seat such that an operator presence switch detects that the operator is seated, the brake pedal must be pushed down so that a brake pedal switch detects that the brake pedal is depressed, and the PTO engagement switch must be moved to the PTO-disengaged position. The on/off switch will only function to start the prime mover if all of these conditions are met. After the prime mover has been started, the operator can drive the riding tractor. To use the implement, the operator must move the PTO engagement switch to the PTO-engaged position, thereby engaging the clutch so that the implement is coupled to the PTO of the prime mover. The operator can interrupt or stop the operation of either the prime mover or the implement in several ways. For example, the prime mover is stopped by moving the on/off switch to the off position or by standing up so that the operator presence switch no longer detects a seated operator. To restart the prime mover, all of the above-mentioned tasks must again be completed before the on/off switch will function to start the prime mover. Frequently, after operation of the prime mover has been interrupted while the implement was engaged, the operator will forgot to move the PTO engagement switch to the PTO-disengaged position before attempting to restart the prime mover and the prime mover will not start. This can result in operator frustration and unnecessary communication to a dealer or maintenance provider to determine why the prime mover will not start.

Figure 3A:
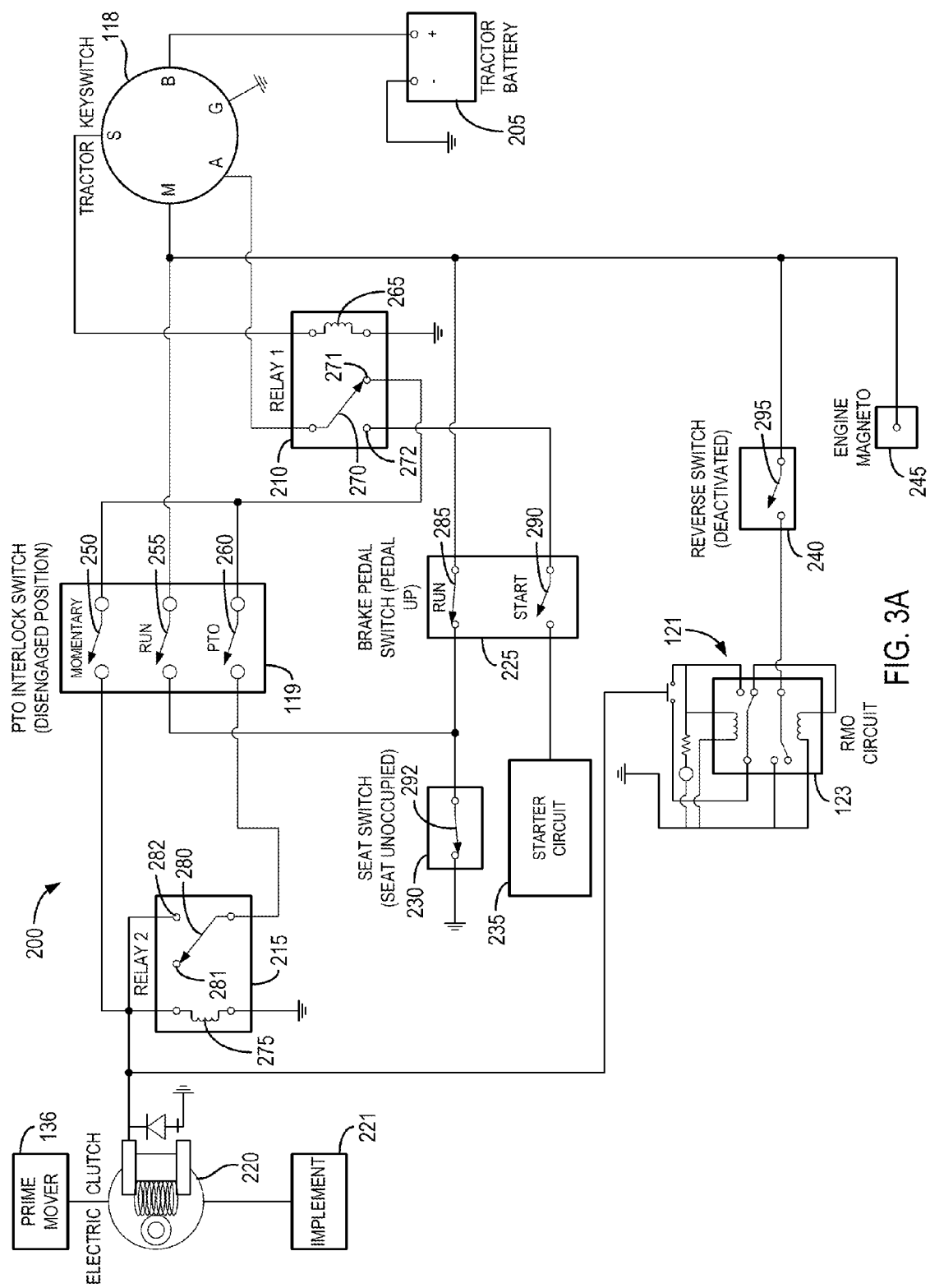
FIG. 3A is a diagram of a circuit associated with the riding tractor of FIG. 1 with a PTO engagement switch in the PTO-disengaged position.
Figure 3B:
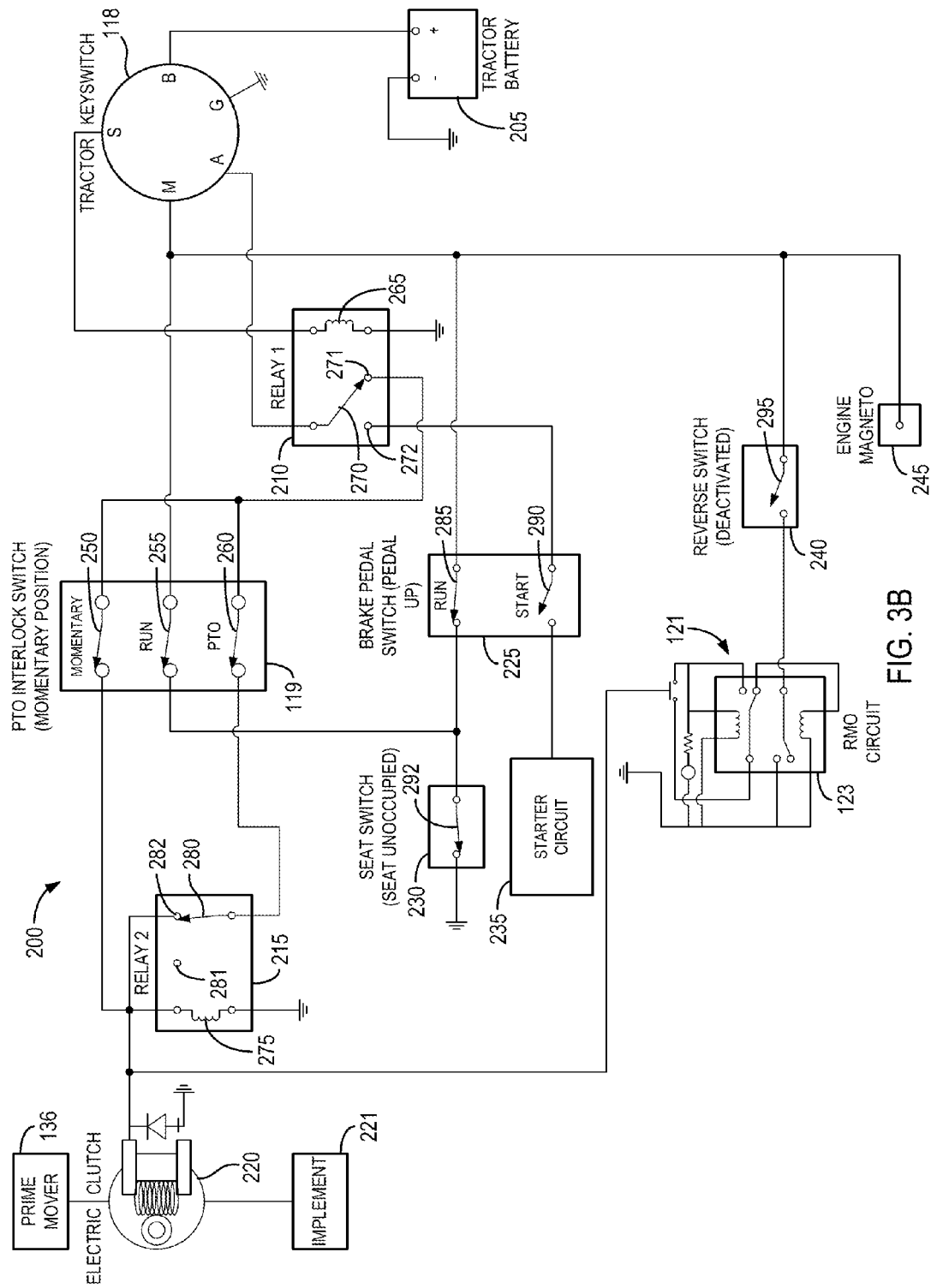
FIG. 3B is a diagram of the circuit of FIG. 3A with the PTO engagement switch in the momentary position.
Figure 3C:
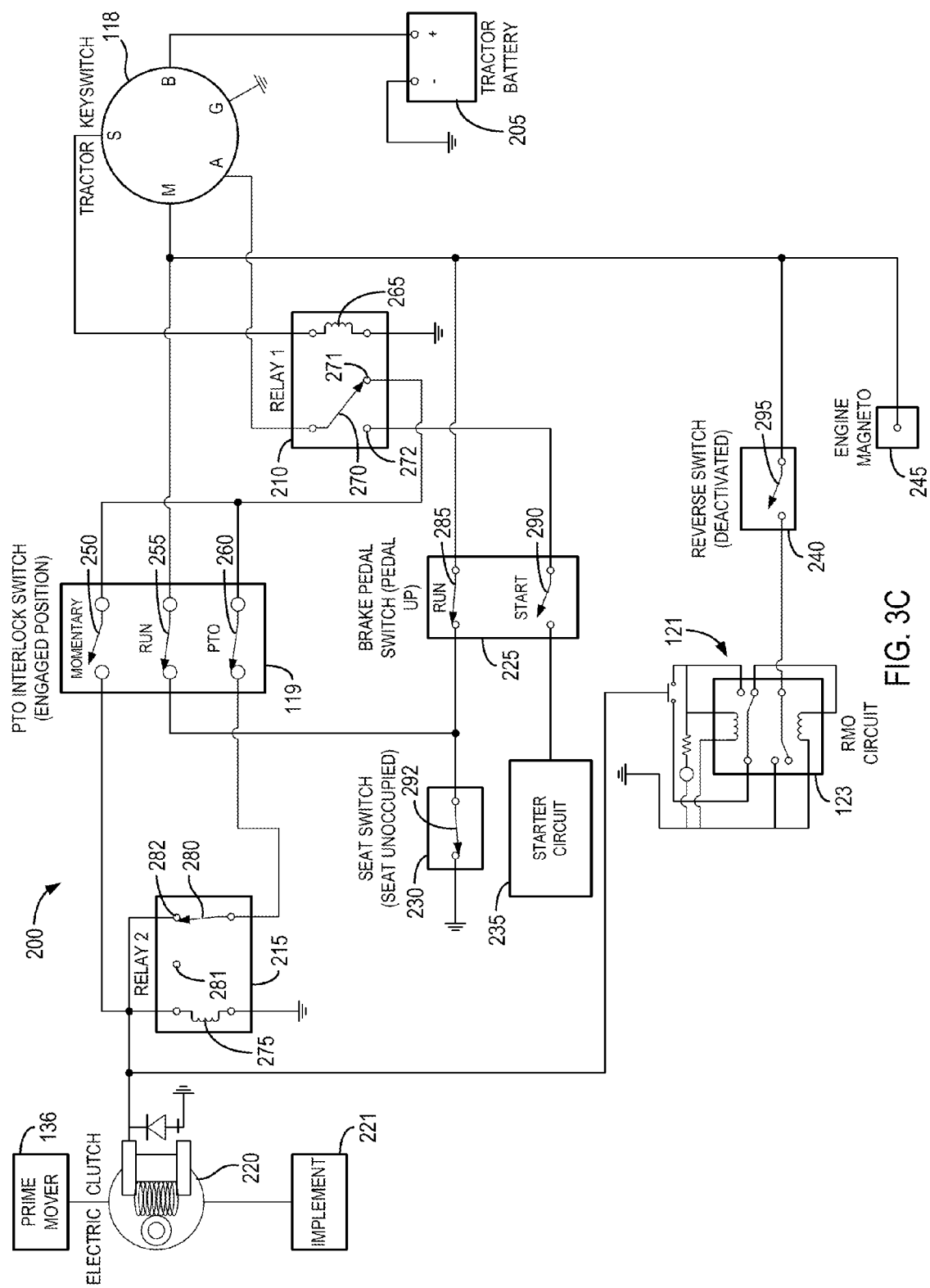
FIG. 3C is a diagram of the circuit of FIG. 3A with the PTO engagement switch in the PTO-engaged position.

Referring to FIGS. 3A-3C, a PTO reset circuit 200 is illustrated. The PTO reset circuit 200 includes a battery or other power supply 205, the on/off switch 118, the PTO engagement switch 119, a first relay 210, a second relay 215, a clutch 220, a brake pedal switch 225, an operator presence or seat switch 230, a starter circuit 235, a reverse switch 240, the RMO circuit 121, and an engine magneto 245.

The on/off switch 118 includes an actuator movable between three positions and five contacts: B, S, M, A, and G. With the actuator in an off position, contacts G and M are closed. With the actuator in a start position (also known as a cranking position for embodiments using an internal combustion engine as the prime mover), contacts A, B, and S are closed. With the actuator in a run position, contacts A and B are closed.

The PTO engagement switch 119 includes an actuator movable between three positions, a PTO-disengaged or off position, a PTO-engaged or on position, and a momentary position. The addition of the momentary position allows for additional functionality beyond that provided by a two-position switch (e.g., allowing the prime mover to start with the PTO engagement switch actuator in the PTO-engaged position). The actuator is held (e.g., fixed, locked, maintained, etc.) in the PTO-disengaged position and the PTO-engaged positions. The actuator is not held in the momentary position. The momentary position is transitory (temporary, intermediate, transitional, etc.). The actuator is biased to the PTO-engaged position from the momentary position. For example, for a push-button switch, the PTO-disengaged position is when the button is fully depressed. An operator would pull the button outwards, past a detent or other stop for the PTO-engaged position to the momentary position. The button then returns to the PTO-engaged position due to the biasing of the button. The PTO engagement switch 119 is configured so that the operator will consistently move the actuator to the momentary position when the operator is attempting to move the actuator to the PTO-engaged position. In this way, the operator receives the benefits of the extra functionality of the momentary position, without having to knowingly move the actuator to momentary position or even being aware that the momentary position exits. Is some embodiments, this is achieved by configuring the PTO engagement switch 119 so that the force required to move the actuator from the PTO-disengaged position to the PTO-engaged position and the spacing between the PTO-engaged position and the momentary position are such that the operator will consistently move the actuator to the momentary position when attempting to move the actuator from the PTO-disengaged position to the PTO-engaged position and the bias will then move the actuator to the PTO-engaged position.

The PTO engagement switch 119 also includes three normally open contacts: a momentary contact 250, a run contact 255, and a PTO contact 260. With the actuator in a PTO-disengaged or off position (FIG. 3A), all three contacts 250, 255, and 260 are open. With the actuator in a momentary position (FIG. 3B), all three contacts 250, 255, and 260 are closed. With the actuator in a PTO-engaged position (FIG. 3C) located between the PTO-disengaged and the momentary positions, contacts 255 and 260 are closed and contact 250 is open.

The first relay 210 includes a coil 265 and a switch 270 movable between two contacts. The switch 270 is normally in a first position connecting an input to a first contact 271 so that power can be transmitted through the switch 270 to the momentary contact 250 of the PTO engagement switch 119. When power is applied to the coil 265, the coil 265 is energized and causes the switch 270 to move to a second position connecting the input to a second contact 272 so that power can be transmitted through the switch 270 through the brake pedal switch 225 to the starter circuit 235. When the switch 270 is the first position, power is not transmitted to the second contact. When the 270 is in the second position, power is not transmitted to the first contact.

The second relay 215 includes a coil 275 and a switch 280 movable between two contacts 281 and 282. The switch 280 is normally open (connected to the contact 281) so that power cannot be transmitted through the switch 280. When power is applied to the coil 275, the coil 275 is energized and causes the switch 280 to move from the open position to the closed position (connected to contact 282) so that power can be transmitted through the switch 280 to the clutch 220. The second relay 280 is configured as a latching relay. Accordingly, after power has been applied to the coil 275, the power transmitted through the closed switch 280 is also applied to the coil 275, thereby keeping the coil 275 energized and latching the switch 280 in the closed position until the supply of power to the coil 275 is interrupted.

The clutch 220 engages the PTO of the prime mover 136 when power is applied to the clutch 220 (e.g., by energizing a magnetic coil), thereby engaging the implement 221. The clutch 220 disengages the PTO of the prime mover 136 when power is not applied to the clutch 220 (e.g., by a spring biasing the clutch to the disengaged position), thereby disengaging the implement 221.

The brake pedal switch 225 includes two contacts: a normally closed run contact 285 and a normally open start contact 290. The two contacts 285 and 290 are in their normal positions when the brake pedal is up. When the brake pedal is depressed, the run contact 285 is open and the start contact 290 is closed, allowing power to be transmitted to the starter circuit 235 when the on/off switch actuator is in the start position. When power is transmitted to the starter circuit 235, the prime mover 136 is started (e.g., by a starter motor or other appropriate starting mechanism controlled by the starter circuit 235).

The operator presence switch 230 includes a normally closed contact 292. When the operator sits in the seat 112, the contact 292 is open. When the operator is not seated in the seat 112, the contact 292 is closed and provides a path to ground.

The reverse switch 240 includes an actuator movable to a reverse position and a normally open contact 295. When the reverse switch actuator is moved to the reverse position, the contact 295 is closed, allowing power to be transmitted to the RMO circuit 121. The RMO circuit 121 includes the RMO actuator 123, which is movable to a reverse-mow-engaged position from a neutral position. The RMO actuator 123 is biased to the neutral position. When the RMO actuator 123 is in the reverse-mow-engage position and the reverse switch 240 is in the reverse position, power is transferred through the RMO circuit 121, which causes the tractor 110 to travel in reverse with the PTO engaged, thereby allowing the tractor 110 to mow in reverse.

When the engine magneto 245 is connected to ground, the engine magneto 245 is in effect "shorted" and thereby turns off the prime mover 136.

The first time the operator goes to start the prime mover 136, the operator sits in the seat 112, opening contact 292 of the operator presence switch 230, the operator depresses the brake pedal, closing start contact 290, and the operator moves the PTO engagement switch actuator to the PTO-disengaged position (FIG. 3A), opening all three contacts 250, 255, and 260 and disengaging the implement 221. The operator then moves the key switch actuator to the start position and power is transmitted to coil 265 of the first relay 210. The energized coil 265 moves the switch 270 to the second position so that power is transmitted through the switch 270 to the closed start contact 290 of the brake pedal switch 225 and then to the starter circuit 235 to start the prime mover 136. The operator is now able to drive the riding tractor 110 by operating the user controls 114. Alternatively, rather than moving the PTO engagement switch actuator to the PTO-disengaged position, the operator could move the PTO engagement switch actuator to the momentary position and then allow the PTO engagement switch actuator to move to the PTO-engaged position. As explained in more detail below, moving the PTO engagement switch actuator to the momentary position prior to the actuator being in the PTO-engaged position allows the prime mover 136 to start with the PTO engagement switch actuator in the PTO-engaged position.

To engage the implement 221 (e.g., the mower cutting blades), the operator moves the PTO engagement switch actuator to the momentary position (FIG. 3B), closing all three contacts 250, 255, and 260. The momentary contact 250 is closed and power is transmitted to coil 275 of the second relay 215. The energized coil 275 moves the switch 280 to the closed position, thereby creating a path for power transmitted through the closed PTO contact 260 to reach the clutch 220. The power transmitted to the clutch 220 causes the clutch 220 to engage, thereby engaging the implement 221.

After the operator releases the PTO engagement switch actuator, the PTO engagement switch actuator moves from the momentary position to the PTO-engaged position (FIG. 3C), opening momentary contact 250, but leaving run contact 260 and PTO contact 265 closed. Power is no longer transmitted to the coil 275 of the second relay 215 via the momentary contact 250. However, power is transmitted to the coil 275 of the second relay 215 via the PTO contact 260, thereby latching the switch 280 in the closed position to transmit power to the clutch 220 and keeping the implement 221 engaged. The run contact 255 is closed in both the momentary and the PTO-engaged positions so that there is a path for power to be transmitted to the operator presence switch 230 without regard for the position of the brake pedal and the brake pedal switch run contact 285.

The implement 221 will remain engaged until the transmission of power to the second relay 215 is interrupted, for example when the PTO engagement switch actuator is moved to the PTO-disengaged position, the on/off switch actuator is moved to the off position, the on/off switch actuator is moved to the start position, or operation of the tractor is interrupted in another way, such as the RMO circuit 121 being accidentally activated through operator use, the operator no longer being present as detected by the operator presence switch 230, etc.

When the operator moves the PTO engagement switch actuator to the PTO-disengaged position, all three contacts 250, 255, and 260 open. Power is no longer transmitted to the coil 275 of the second relay 215 via either the momentary contact 250 or the PTO contact 260. This deenergizes the coil 275, allowing the switch 280 to move to the open position. With the switch 280 in the open position, power is no longer transmitted to the clutch 220 causing the clutch to disengage, thereby disengaging the implement 221. The prime mover 136 continues to run until the operator takes an action necessary to stop the prime mover 136 (e.g., moving the on-off switch actuator to the off position).

When the operator moves the on/off switch actuator to the off position, power is no longer transmitted to the second relay 215 and therefore is no longer transmitted to the clutch 220, causing the clutch to disengage, thereby disengaging the implement 221. Operation of the prime mover 136 is also stopped by moving the on/off switch actuator to the off position.

The implement 221 is automatically disengaged upon restarting the prime mover 136 after operation of the prime mover 136 has been interrupted or otherwise stopped with the implement 221 engaged. Several methods of interrupting the operation of the prime mover 136 will be discussed in more detail below.

In contrast to the control systems provided in conventional riding mowers, in preferred embodiments of the invention presented in this application, the operator does not need to remember to move the PTO engagement switch actuator to the PTO-disengaged position in order to start the prime mover 136. With the on/off switch actuator in the start position, power is transmitted via the S contact to the coil 265 of the first relay 210. The energized coil 265 moves the switch 270 to the second position, thereby disconnecting the PTO relay 260 of the PTO engagement switch 119 from the switch 270 and preventing power from being distributed through the closed PTO relay 260. This deenergizes the coil 275 of the second relay 215, unlatching the second relay 215 and allowing the switch 280 to open. With the switch 270 in the second position and the switch 280 in the open position, there is no path to transmit power through the open momentary contact 250 or the closed PTO contact 260 to the clutch 220, so the clutch 220 and the implement 221 are disengaged. When the on/off switch actuator moves from the start position to the run position, the implement 221 and the clutch 220 remain disengaged because the switch 280 of the second relay 215 will remain in its normally open position until the coil 275 is reenergized by moving the PTO engagement switch actuator to the momentary position.

To engage the implement 221 after the prime mover 136 has been started with the PTO engagement switch actuator in the PTO-engaged position, the operator moves the PTO engagement switch actuator to the momentary position, thereby closing the momentary contact 250 and energizing the coil 275 of the second relay 215. As previously explained, this allows power to be transmitted to the clutch 220 to engage the implement 221.

Alternatively, the implement 221 and the clutch 220 are disengaged whenever the prime mover 136 is stopped or otherwise has its operation interrupted. The implement 221 and clutch 220 can then be re-engaged by moving the PTO engagement switch actuator to the momentary position and then the PTO-engaged position.

The operation of the prime mover 136 can be interrupted in several ways, for example, with the on/off switch 118, the operator presence switch 230, and incorrect operation of the RMO circuit 121 including the reverse switch 240 and the RMO actuator 123.

Moving the on/off switch actuator to the off position connects contact M of the on/off switch 118 to ground via contact G. The engine magneto 245 is in effect "shorted" and thereby turns off the prime mover 136.

The operator standing up from the seat 112 or otherwise allowing the seat 112 to move sufficiently to actuate the operator presence switch 230, allows contact 292 to move to its normally closed position and connects the operator presence switch 230 to ground. When the PTO engagement switch 119 is in the PTO-engaged position, the operator presence switch 230 functions to interrupt the prime mover 136 without regard for the position of the brake pedal and the brake pedal switch 225. The engine magneto 245 is in effect "shorted" and thereby turns off the prime mover 136. When the PTO engagement switch 119 is in the PTO-disengaged position, the operator can stand up or otherwise leave the seat 112 so that contact 292 of the operator presence switch 230 is closed without interrupting the operation of the prime mover 136, so long as the brake pedal is depressed and the run contact 285 is open. Depressing the brake pedal opens the run contact 285 of the brake pedal switch 225 and prevents power from being transmitted to the operator presence switch 230 and then to ground. In this way, the prime mover 136 continues to run because the engine magneto 245 is not shorted.

Incorrect operation of the RMO circuit 121 also interrupts operation of the prime mover 136. The RMO circuit 121 allows the operator to drive the riding tractor 110 in reverse with the implement 221 engaged (e.g., mow in reverse). When the clutch 220 is initially engaged by operation of the PTO engagement switch 119, the RMO actuator 123 connects the normally open contact 295 of the reverse switch 240 to ground such that moving the reverse switch actuator to the reverse position grounds the circuit and the magneto 245 turns off the prime mover 136. When the RMO actuator 123 is moved to the reverse-mow-engaged position, a momentary contact is closed, and a relay latches that disconnects the reverse switch 240 from ground. This allows the operator to use the reverse switch 240 to mow in reverse. The relay of the RMO circuit 121 remains latched to allow for reverse moving until power is no longer transmitted to the clutch 220.

Alternatively, incorrect operation of the RMO circuit 121 could result in interruption of the operation of the implement 221, rather than interruption of the operation of the prime mover 136. Rather than providing a path to ground through the RMO actuator 123 upon incorrect operation of the RMO circuit 121, the circuit transmitting power to the clutch 220 could be broken. In this way, the clutch 220 and the implement 221 would be disengaged and the prime mover 136 would continue to run. The riding tractor 110 would move in reverse, but the implement 221 would not be engaged (e.g., the riding tractor 110 moves in reverse but does not mow grass while doing so). After the operator stops incorrectly operating the RMO circuit 121, the implement 221 can be reengaged by moving the PTO engagement switch actuator to the momentary position. As explained above, this causes the clutch 220 and the implement 221 to engage.

Figure 4A:
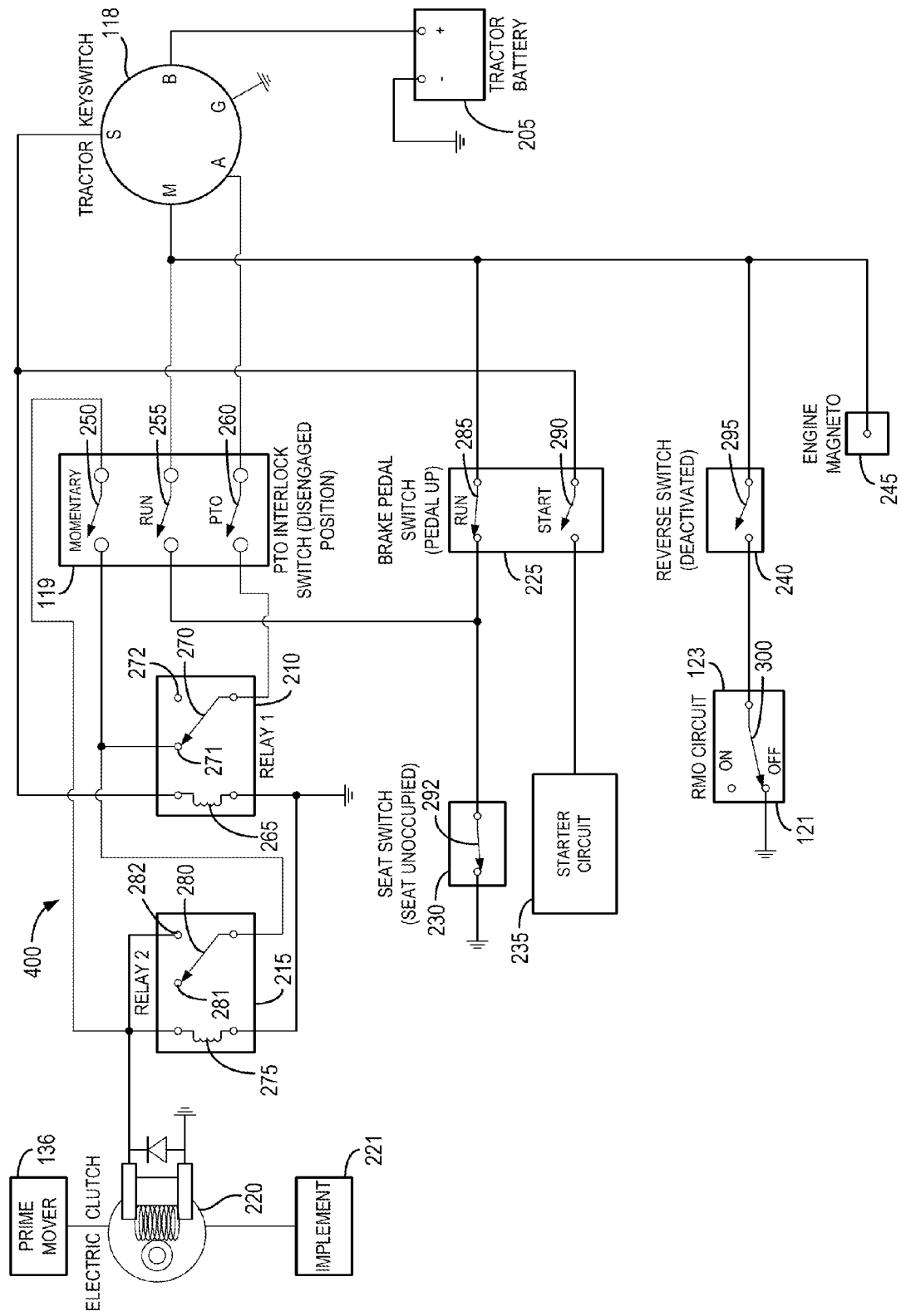
FIG. 4A is a diagram of another exemplary embodiment of a circuit associated with the riding tractor of FIG. 1 with a PTO engagement switch in the PTO-disengaged position.
Figure 4B:
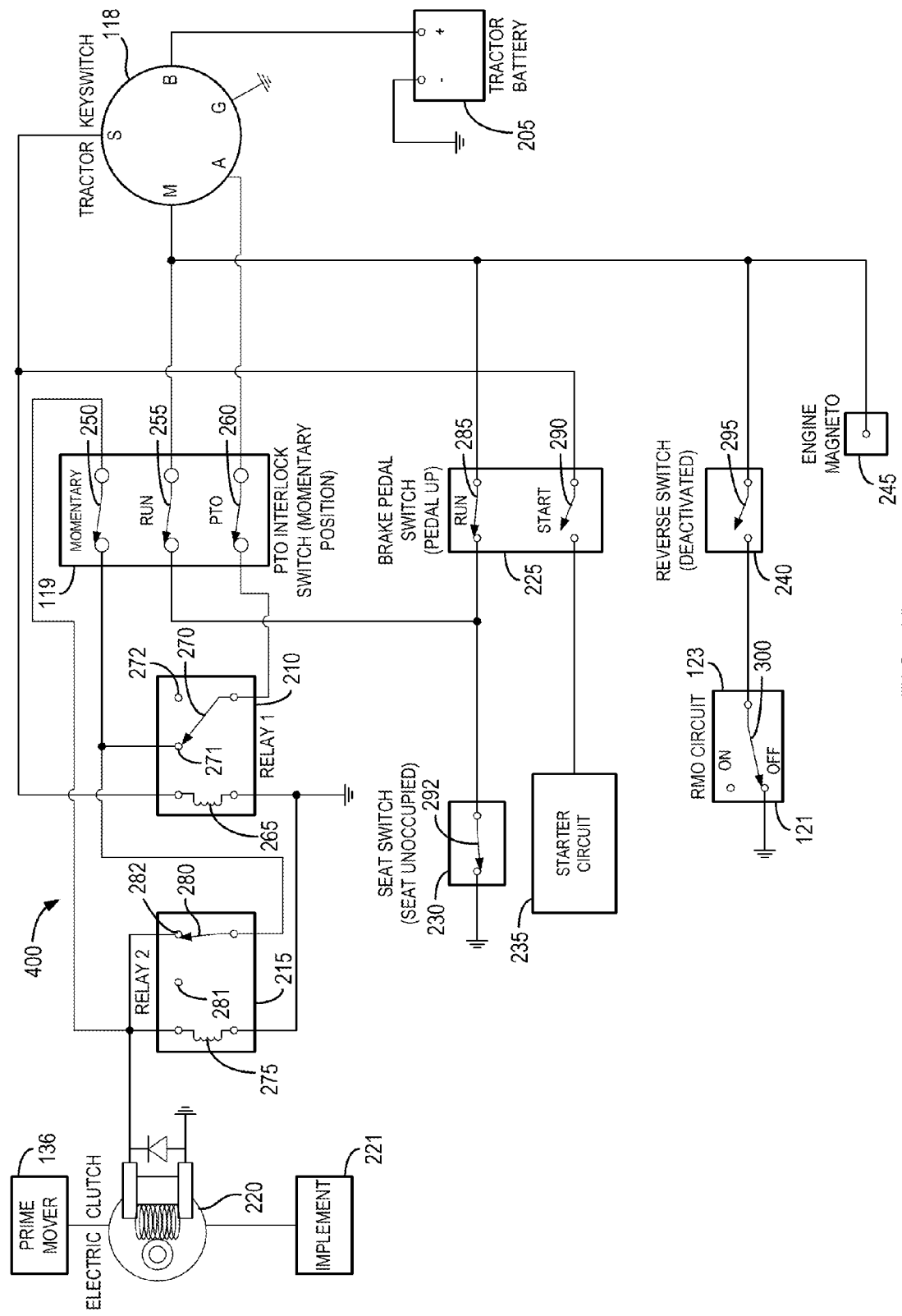
FIG. 4B is a diagram of the circuit of FIG. 4A with the PTO engagement switch in the momentary position.
Figure 4C:
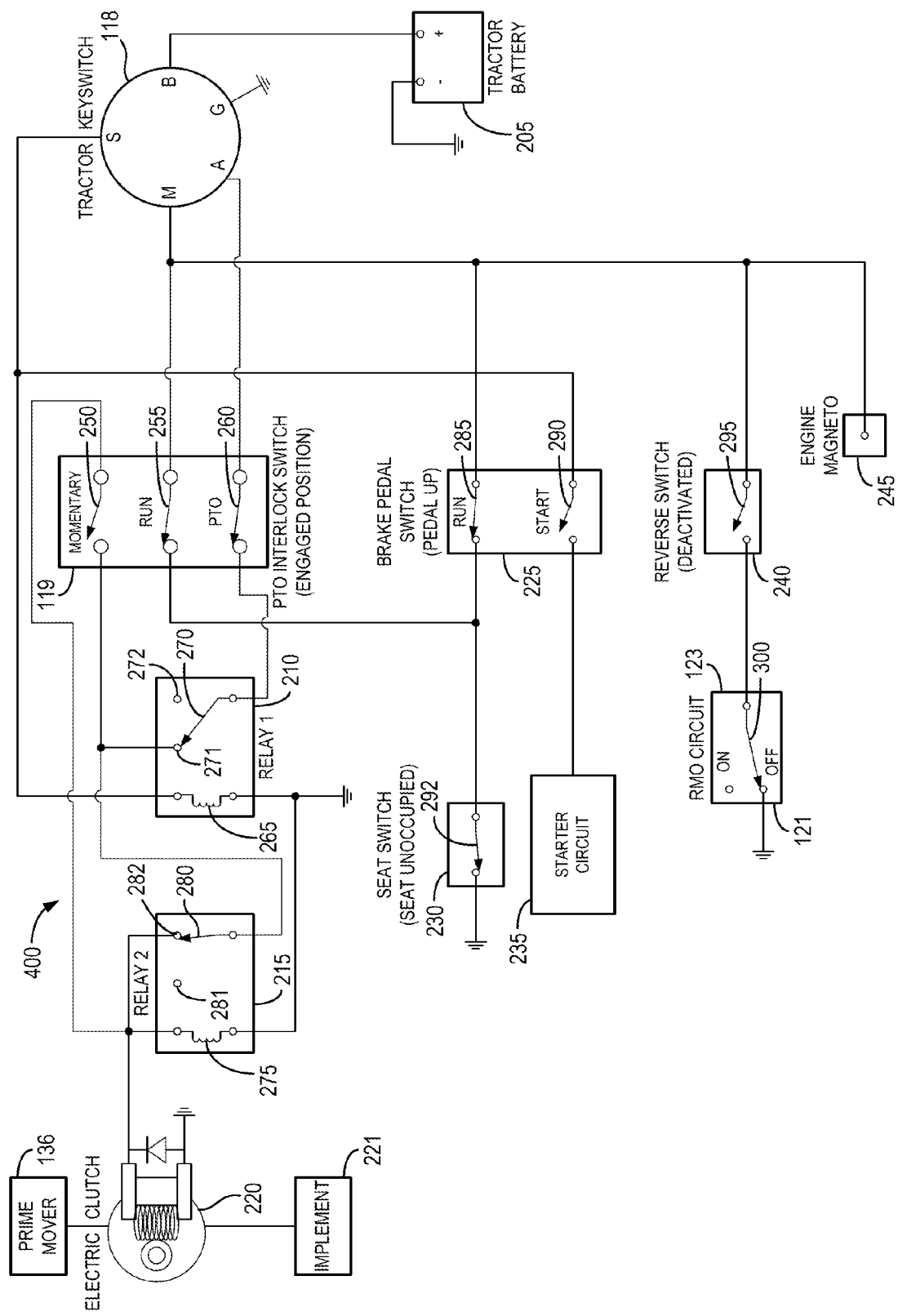
FIG. 4C is a diagram of the circuit of FIG. 4A with the PTO engagement switch in the PTO-engaged position.

Referring to FIGS. 4A-4C, a PTO reset circuit 400 is illustrated in accordance with another exemplary embodiment. The PTO reset circuit 400 includes the same components as the PTO reset circuit 200, except some of the components are arranged differently with respect to one another. These differences are discussed in more detail below.

The first relay 210 includes a coil 265 and a switch 270 movable between two contacts 271 and 272. The switch 270 is normally closed (connected to the contact 271) so that power can be transmitted through the switch 270. When the power is applied to the coil 265, the coil 265 is energized and causes the switch 270 to move from the closed position to the open position (e.g. connected to the contact 272) so that power cannot be transmitted through the switch 270.

The second relay 215 includes a coil 275 and a switch 280 movable between two contacts 281 and 282. The switch 280 is normally open (connected to the contact 281) so that power cannot be transmitted through the switch 280. When power is applied to the coil 275, the coil 275 is energized and causes the switch 280 to move from the closed position to the open position (connected to the contact 282) so that power can be transmitted through the switch 280. The second relay 280 is a latching relay. Accordingly, after power has been applied to the coil 275, the power transmitted through the closed switch 280 is also applied to the coil 275, thereby latching the switch 280 in the closed position.

To start the prime mover 136, the operator sits in the seat 112, opening contact 292 of the operator presence switch 230, the operator depresses the brake pedal, closing start contact 290, and the operator moves the PTO engagement switch actuator to the PTO-disengaged position (FIG. 4A), opening all three contacts 250, 255, and 260 and disengaging the implement 221. The operator then moves the key switch actuator to the start position and power is transmitted to the starter circuit 235 to start the prime mover 136. The operator is now able to drive the riding tractor 110 by operating the user controls 114. Alternatively, rather than moving the PTO engagement switch actuator to the PTO-disengaged position, the operator could move the PTO engagement switch actuator to the momentary position and then allow the PTO engagement switch actuator to move to the PTO-engaged position. As explained in more detail below, moving the PTO engagement switch actuator to the momentary position prior to the actuator being in the PTO-engaged position allows the prime mover 136 to start with the PTO engagement switch actuator in the PTO-engaged position.

To engage the implement 221 (e.g., the cutting blades), the operator moves the PTO engagement switch actuator to the momentary position (FIG. 4B), closing all three contacts 250, 255, and 260. The momentary contact 250 is closed and power is transmitted to coil 275 of the second relay 215. The energized coil 275 moves the switch 280 to the closed position, thereby transmitting power to complete a circuit with the first relay 210. The PTO contact 260 is closed and power is transmitted through the normally closed switch 270 of the first relay 210, through the closed switch 280 of the second relay 215 to the clutch 220. The power transmitted to the clutch 220 causes the clutch 220 to engage, thereby engaging the implement 221.

After the operator releases the PTO engagement switch actuator, the PTO engagement switch actuator moves from the momentary position to the PTO-engaged position (FIG. 4C), opening momentary contact 250, but leaving run contact 260 and PTO contact 265 closed. Power is no longer transmitted to the coil 275 of the second relay 215 via the momentary contact 250. However, power is transmitted to the coil 275 of the second relay 215 via the PTO contact 260, thereby latching the switch 280 in the closed position to transmit power to the clutch 220 and keeping the implement 221 engaged. The run contact 255 is closed in both the momentary and the PTO-engaged positions so that there is a path for power to be transmitted to the operator presence switch 230 without regard for the position of the brake pedal and the brake pedal switch run contact 285.

The implement 221 will remain engaged until the transmission of power to the second relay 215 is interrupted, for example when the PTO engagement switch actuator is moved to the PTO-disengaged position, the on/off switch actuator is moved to the off position, or the on/off switch actuator is moved to the start position, or operation of the tractor is interrupted in another way, such as the RMO circuit 121 being accidentally activated through operator use, the operator no longer being present as detected by the operator presence switch 230, etc.

When the operator moves the PTO engagement switch actuator to the PTO-disengaged position, all three contacts 250, 255, and 260 open. Power is no longer transmitted to the coil 275 of the second relay 215 via either the momentary contact 250 or the PTO contact 260. This deenergizes the coil 275, allowing the switch 280 to move to the open position. With the switch 280 in the open position, power is no longer transmitted to the clutch 220, thereby disengaging the clutch 220 and the implement 221. The prime mover 136 continues to run until the operator takes an action necessary to stop the prime mover 136 (e.g., moving the on-off switch actuator to the off position).

When the operator moves the on/off switch actuator to the off position, power is no longer transmitted to the second relay 215 and therefore is no longer transmitted to the clutch 220, causing the clutch to disengage, thereby disengaging the implement 221. Operation of the prime mover 136 is also stopped by moving the on/off switch actuator to the off position.

The implement 221 is automatically disengaged upon restarting the prime mover 136 after operation of the prime mover 136 has been interrupted or otherwise stopped with the implement 221 engaged. Several methods of interrupting the operation of the prime mover 136 were previously discussed in more detail above.

In contrast to the control systems provided in conventional riding mowers, in preferred embodiments of the invention presented in this application, the operator does not need to remember to move the PTO engagement switch actuator to the PTO-disengaged position in order to start the prime mover 136. With the on/off switch actuator in the start position, power is transmitted via the S contact to the coil 265 of the first relay 210. The energized coil 265 moves the switch 270 to the open position (connected to the contact 272), thereby breaking the circuit between the first relay 210 and the second relay 215 and unlatching the second relay 210 so that the switch 280 is opened (connected to the contact 281). With the switches 270 and 280 open, there is no path from the open momentary contact 250 or the closed PTO contact 260 to the clutch 220, so the clutch 220 and the implement 221 are disengaged. When the on/off switch actuator moves from the start position to the run position, the implement 221 and the clutch 220 remain disengaged because the switch 280 of the second relay 215 will remain in its normally open position until the coil 275 is reenergized by moving the PTO engagement switch actuator to the momentary position.

To engage the implement 221 after the prime mover 136 has been started with the PTO engagement switch actuator in the PTO-engaged position, the operator moves the PTO engagement switch actuator to the momentary position, thereby closing the momentary contact 250 and energizing the coil 275 of the second relay 215. As previously explained, this allows power to be transmitted to the clutch actuator 220 to engage the implement 221.

In some embodiments, a processing circuit is configured to perform at least some of the functions of PTO circuits 200 and 400 described above. A processing circuit can include a processor and memory device. Processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein.

The embodiments of PTO circuits 200 and 400 discussed above solve the problem of the operator being unable to start the prime mover when the operator forgets to move the PTO engagement switch to the PTO-disengaged position before attempting to restart the prime mover. This solution reduces operator frustration and unnecessary communications to dealers and/or maintenance providers.

Although the embodiments of PTO circuits 200 and 400 discussed above have described with respect to a riding tractor (e.g., riding tractor 110), the embodiments of PTO circuits 200 and 400 discussed above could be applied to other types of outdoor power equipment, including stand-on or sitting zero turn radius mowers, walk-behinds, RERs, and ZTRs.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A tractor, comprising:
a prime mover;
a driven implement selectively engaged with the prime mover; and
a switch for selectively engaging and disengaging the driven implement with the prime mover, the switch having three positions including a disengaged position, a momentary position, and an engaged position located between the disengaged position and the momentary position;
wherein the prime mover can be started with the switch in the disengaged position; and
wherein the prime mover can be started with the switch in the engaged position when the switch was previously moved to the momentary position before being moved to the engaged position, such that after operation of the prime mover is stopped, the prime mover can be restarted without changing the position of the switch.

2. The tractor of claim 1, wherein after the prime mover is stopped, the driven implement is disengaged upon restarting of the prime mover when the switch is in any of the three positions.

3. The tractor of claim 2, wherein the driven implement is reengaged with the prime mover by moving the switch to the momentary position.

4. The tractor of claim 2, further comprising:
a clutch for engaging and disengaging the driven implement from the prime mover; and
a latching relay electrically coupled between the clutch and the switch;
wherein the latching relay is latched when the switch is moved to the momentary position and then to the engaged position, thereby engaging the clutch; and
wherein the latching relay is unlatched upon starting the prime mover when the switch is in any of the three positions, thereby disengaging the clutch.

5. The tractor of claim 4, wherein the latching relay is unlatched when the switch is in the disengaged position, thereby disengaging the clutch.

6. The tractor of claim 5, further comprising:
an on/off switch for turning the prime mover on and off;
wherein the latching relay is unlatched when the on/off switch is moved to an off position, thereby disengaging the clutch.

7. The tractor of claim 1, wherein the driven implement is disengaged when the prime mover is stopped.

8. The tractor of claim 1, wherein the driven implement is one of a cutting blade, a mower deck, a snow thrower, a snow auger, a brush, a winch, a front end loader, a rear backhoe, a post hole auger, a tiller, and a rear-mounted mower.

9. The tractor of claim 1, wherein the prime mover is stopped in response to a signal from an on/off switch, an operator presence switch, a parking brake sensor, a combination of the parking brake sensor and the operator presence switch, a combination of the switch in the engaged position and the operator presence switch, or a reverse mow override circuit.

10. The tractor of claim 1, wherein the prime mover is stopped by the prime mover stalling, by the prime mover running out of fuel, due to a blown fuse or circuit breaker, or due to a low or drained battery.

11. A tractor, comprising:
a prime mover;
a driven implement selectively engaged with the prime mover; and a multi-position switch for selectively engaging and disengaging the driven implement with the prime mover, the switch having three positions including a disengaged position, a momentary position, and an engaged position located between the disengaged position and the momentary position, wherein the prime mover can be started without the multi-position switch being in a disengaged position.

12. The tractor of claim 11, wherein the prime mover is stopped in response to a signal from an on/off switch, an operator presence switch, a parking brake sensor, a combination of the parking brake sensor and the operator presence switch, a combination of the switch in the engaged position and the operator presence switch, or a reverse mow override circuit.

13. The tractor of claim 11, further comprising:
a clutch for engaging and disengaging the driven implement from the prime mover; and
a latching relay electrically coupled between the clutch and the switch;
wherein the latching relay is latched when the switch is moved to the momentary position and then to the engaged position, thereby engaging the clutch; and
wherein the latching relay is unlatched upon starting the prime mover when the switch is in any of the three positions, thereby disengaging the clutch.

14. The tractor of claim 11, wherein the prime mover is stopped by the prime mover stalling, by the prime mover running out of fuel, due to a blown fuse or circuit breaker, or due to a low or drained battery.

15. A tractor, comprising:
a prime mover;
a driven implement selectively engaged with the prime mover by a clutch;
a switch for selectively engaging and disengaging the driven implement with the prime mover, the switch having three positions including a disengaged position, a momentary position, and an engaged position located between the disengaged position and the momentary position; and
a latching relay electrically coupled between the clutch and the switch;
wherein upon loss of electrical power to the latching relay the driven implement is disengaged; and
wherein, following disengagement of the driven implement, the driven implement is re-engaged by movement of the switch from the engaged position to the momentary position without having to return the switch to the disengaged position.

16. The tractor of claim 15, wherein the latching relay is unlatched when the switch is in the disengaged position, thereby disengaging the clutch.

17. The tractor of claim 15, wherein the prime mover is stopped in response to a signal from an on/off switch, an operator presence switch, a parking brake sensor, a combination of the parking brake sensor and the operator presence switch, a combination of the switch in the engaged position and the operator presence switch, or a reverse mow override circuit.

18. The tractor of claim 15, wherein the prime mover is stopped by the prime mover stalling, by the prime mover running out of fuel, due to a blown fuse or circuit breaker, or due to a low or drained battery.

19. The tractor of claim 15, wherein after the prime mover is stopped, the driven implement is disengaged upon restarting of the prime mover when the switch is in any of the three positions.

* * * * *